United States Patent
Garcia Perez et al.

(10) Patent No.: US 8,832,800 B2
(45) Date of Patent: Sep. 9, 2014

(54) METHOD FOR PRODUCING AN ELECTRO-BIOMETRIC SIGNATURE ALLOWING LEGAL INTERACTION BETWEEN AND IDENTIFICATION OF PERSONS

(75) Inventors: Pedro Pablo Garcia Perez, Nuevo Leon (MX); Juan Luis Soto Decuir, Nuevo Leon (MX); Ciro Alfonso Herrera Ramirez, Nuevo Leon (MX)

(73) Assignee: Administradora de Proyectos y Sistemas Avanzados, S.C. (MX)

( * ) Notice: Subject to any disclaimer, the term of this patent is extended or adjusted under 35 U.S.C. 154(b) by 165 days.

(21) Appl. No.: 13/391,984

(22) PCT Filed: Aug. 24, 2010

(86) PCT No.: PCT/MX2010/000080
§ 371 (c)(1),
(2), (4) Date: Apr. 6, 2012

(87) PCT Pub. No.: WO2011/025352
PCT Pub. Date: Mar. 3, 2011

(65) Prior Publication Data
US 2012/0192254 A1 Jul. 26, 2012

(30) Foreign Application Priority Data
Aug. 24, 2009 (MX) .................... MX/a/2009/009050

(51) Int. Cl.
*G06F 15/16* (2006.01)
(52) U.S. Cl.
USPC .......... 726/4; 726/5; 726/17; 726/18; 726/19; 726/21; 705/67; 713/173; 713/175; 713/176; 713/177; 713/180

(58) Field of Classification Search
CPC ..................................................... G06F 21/32
USPC .......... 726/4–5, 17–19, 21; 705/67; 713/173, 713/175, 176, 177, 180
See application file for complete search history.

(56) References Cited

U.S. PATENT DOCUMENTS

| | | | |
|---|---|---|---|
| 5,229,764 A * | 7/1993 | Matchett et al. | 340/5.52 |
| 6,853,988 B1 | 2/2005 | Dickinson et al. | |
| 7,107,248 B1 * | 9/2006 | Asokan et al. | 705/67 |
| 7,328,341 B1 * | 2/2008 | Eun et al. | 713/165 |
| 8,150,772 B2 * | 4/2012 | Mardikar et al. | 705/64 |
| 2005/0216742 A1 | 9/2005 | Wong et al. | |
| 2007/0241861 A1 | 10/2007 | Venkatanna et al. | |
| 2008/0148059 A1 | 6/2008 | Shapiro | |

OTHER PUBLICATIONS

International Search Report for PCT/MX2010/000080, English translation attached to original, Both completed by the Mexican Patent Office on Jul. 5, 2011, All together 7 Pages.
Website "Public key infrastructure", English translation attached to original, Alltogether 9 Pages, Retrieved on Oct. 30, 2012. http://es.wikipedia.org/w/index.php?title=Infraestructura_de_clave_p%C3%BAblica&oldid=27807634#Usos_de_la_tecnolog.C3.ADa_PKI.

* cited by examiner

*Primary Examiner* — Thanhnga B Truong
(74) *Attorney, Agent, or Firm* — Brooks Kushman PC

(57) ABSTRACT

A method for producing an electro-biometric signature allowing legal interaction between and the identification of persons utilizing biometric features. The method includes inputting a user's biometric features in a pre-determined sequence and checking that no feature is entered repeatedly.

10 Claims, 9 Drawing Sheets

METHOD FOR PRODUCING AN ELECTRO-BIOMETRIC SIGNATURE ALLOWING LEGAL INTERACTION BETWEEN AND IDENTIFICATION OF PERSONS

CROSS-REFERENCE TO RELATED APPLICATION

This application is the U.S. national phase of PCT Appln. No. PCT/MX2010/000080 filed Aug. 24, 2010, which claims priority to Mexican application MX/a/2009/009050 filed on Aug. 24, 2009 the disclosures of which are incorporated in their entirety by reference herein.

OBJECT OF THE INVENTION

To provide a transparent non-reprehensible method to sign electronically while consigning the legitimate expression of will as well as the legal identity of the signer, ratified with biometric and non-biometric elements. The method could be managed remotely or nearby by electronic means through a combination of processes involving the input of biometric and non-biometric data, said processes being complementary to each other, a unique method for the legally appropriate electronic expression, safe and reliable of the facts (record of acts), or legal acts expressed under the name of advanced electro biometric signature. For the purpose of this application, the definition of electronic signature is to be understood as derived from article 89 of Mexican Commercial Code:

ELECTRONIC SIGNATURE: DATA CONSIGNED IN A DATA MESSAGE BY ELECTRONIC MEANS, O ATTACHED OR LOGICALLY ASSOCIATED TO THE SAME BY ANY TECHNOLOGY, WHICH ARE USED TO IDENTIFY THE SIGNER IN RELATION TO THE DATA MESSAGE AND TO INDICATE THAT THE SIGNER APPROVES THE INFORMATION CONTAINED IN THE DATA MESSAGE, PRODUCING THE SAME LEGAL EFFECTS AS THE AUTOGRAPHIC SIGNATURE, IT BEING ADMISSIBLE AS PROOF IN TRIAL.

Once the full identification of the parties is achieved, the object is to obtain legal certainty of the expression of will in the act they conduct or participate into. Said event could be of any nature, e.g.: electronic signature to be held notified, to approve the day's agenda, to issue written evidence and certifications, determination of tax credit, ruling of financial statements by certified public accountant, approval of remote or ATM bank transactions, attribution of authorship of documents, issue and acceptance of power of attorney, issuing of document attestation, to act in legal acts, among many other purposes that a signature may have. The aforementioned in accordance with the principle of functional equivalence of both autographic and electronic signature, confirmed in legal rulings of international application relative to the use of electronic signatures. Our method of signature lies within the principles of technological neutrality and autonomy of will. Being central to the structure the due legal appropriateness of the signature, which at all times keeps non-reprehensible relation with each one of the acts expressed by the will of the signer, according to that which is established by the United Nations Commission on International Trade Law (UNCITRAL) in its electronic signatures section. The aforementioned being showed, we find that the system cannot be considered limited to a method for secure access, neither limited to a signature based on "n" number of authentications to sign into session, nor considered as systematic security measures.

The purpose of our system is to constitute a method of electronic signature which coordinates an monitors everything from the time it takes to the system to request again a biometric trait for the legal identification and full validation of the session, to the precise and timely request (of traits and information if necessary) made to the signer, as a confirmation of his will. This is the way we may confer with the most certainty possible (margin of error close to cero) that the signature belongs to his emitter in case that the required elements are fulfilled. Also we can confer that, with the security measures we will detail below, the principle of autonomy of will is protected.

The method fully comprises of two active elements, said elements being: the manifestation or expression of will; and the valid and legal identification, both inherent to the signer, who must attend in time, manner and place. Each validated pair (of combined elements) will comprise a bio-digital certificate, also granting a guarantee of "preservation of original form" of the document or expression. A third element categorized as reactive, will deploy necessary measures, keeping the security and integrity of the acts and information in its previous natural state. Thus achieving that those electronic signatures issued under contingency or emergency circumstances, such as robbery, kidnapping, etc. do not affect the course of other non-foul operations, nor the natural state they kept previously, fulfilling the object of protecting the principle of autonomy of will in a great extent.

The object described in the aforementioned lines, will not be limitative in any way for the electro biometric signature to be suitable of implementation within electronic applications in attendance manners Such manners as bank access doors, at entry and then signing at exit and/or closing operations, in such manner that this method helps to provide ratified wills with legal certainty in time, place and manner, as well as to facilitate the adoption of necessary measures in extreme or contingency cases. Another brief example could occur while getting into an automated parking lot by entering a biometric trait (e.g. fingerprint) of the driver in a terminal, adding a picture of the vehicle's license plate and/or a scan of the driver's id to the template created, and once again collating of the same procedure at exit of the parking complex, in the understanding that the unique combination of fingerprint and license plate authorizing said vehicle to leave, is the same combination with which it entered the parking lot.

BACKGROUND OF THE INVENTION

Throughout time, information technologies have developed different ways to link information in electronic form to certain persons, to ensure the inviolability of such information or allow people to prove their right or authorization to gain access to a particular service or a data bank. They are often called methods of "authentication" or "electronic signature". This does not grant full legal security, since collating the identity and credentials of an individual is not the same as said individual approving an agreement, casting his vote or signing a document. Being so important both identification and expression of will, we do not consider appropriate the omission of steps or avoidance of processes which are correct and legally distinct. We propose a method adhered to the criteria suggested by the United Nations Commission on International Trade Law on electronic signatures.

Initiated proceedings for a patent to a method for secure access to devices and systems under application US2007/0241861 A1, which uses biometrics for authentication of users, has a distant concept but very vague and broad from the perspective, purpose and method proposed below, as it is does not comprise a method to achieve a signature, much less will it consign differentiated will of who issues it. But for historical purposes, perhaps, at the discretion of this Honorable Reviewer Organization, it can be considered as a precedent.

There are problems related to remotely identification of persons (use of ATM, remote access to systems through internet/intranet, etc.) when these persons voluntarily lend their identification devices and/or usernames or passwords provided by government, credit or financial or any kind of institutions, to third parties fro them to perform operations on their behalf: to distinguish between people identification (intelligent dynamic key), preservation of documents in their "original form" and the manifestation of the agreement of wills, authorship, certification, issuance of public trust, approval, testament proceedings, apostille, sealing, empowerment, etc.

It is necessary to have a differentiated approach of signing per event with signature validity restricted over as opposed to per session, due to the fact that a user may have entered the system and may have made a number of activities but not therefore giving consent and/or authorship to each and every one of the acts executed.

To increase remote access security to systems by means of a recognition device with biometric capabilities, portable or fixed capable of storing by itself, or in combination with the use of another device addressed for storage (e.g. internal or external to a PC) of data relating to digital certificates or public and/or private keys, as well as the processes necessary to enter the system and/or in combination with a computer system to produce the necessary interaction with the host.

DETAILED DESCRIPTION OF THE INVENTION

Figure 1:
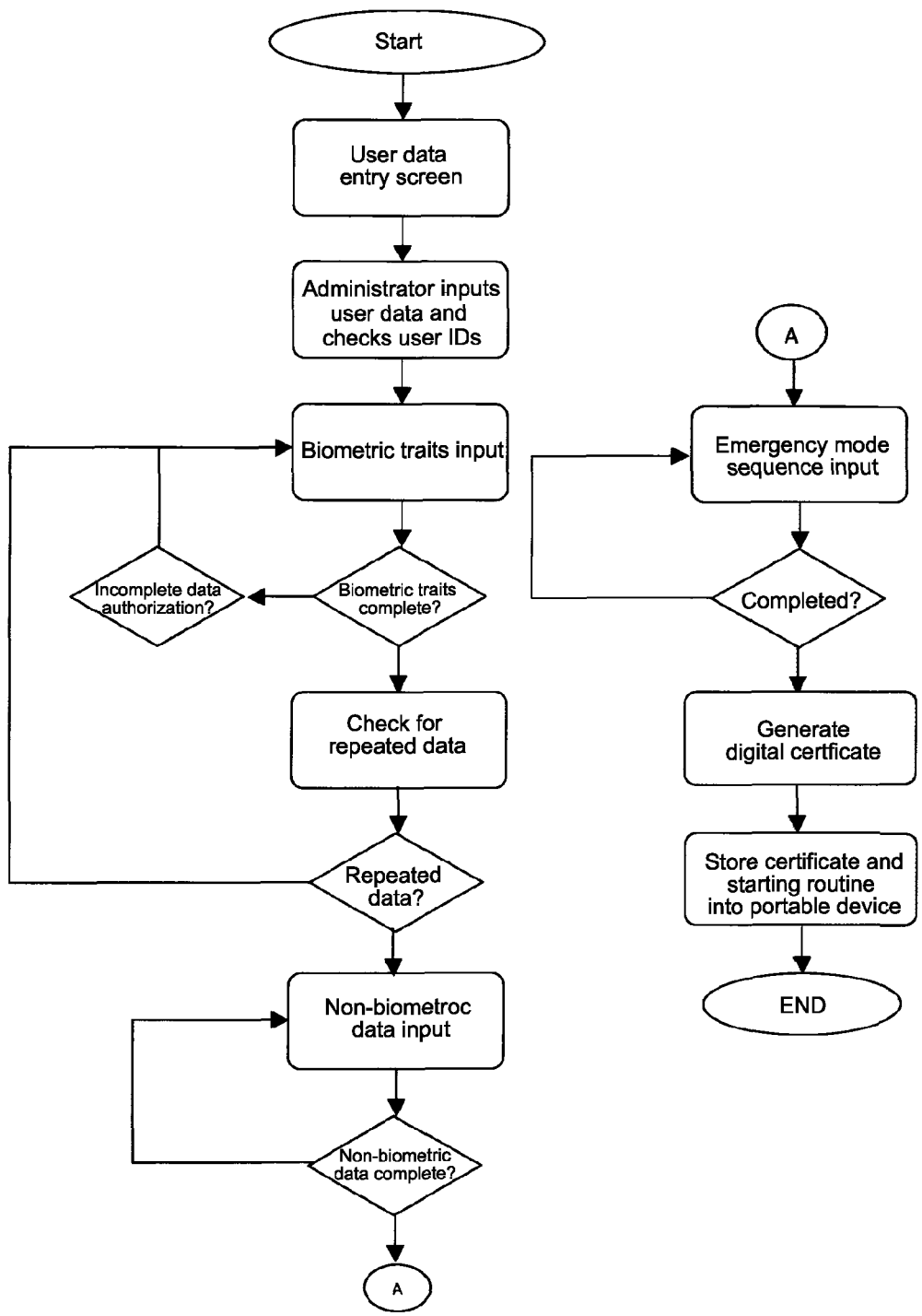
FIG. 1 shows the method of configuration of user profiles and emergency mode sequence.
Figure 2:
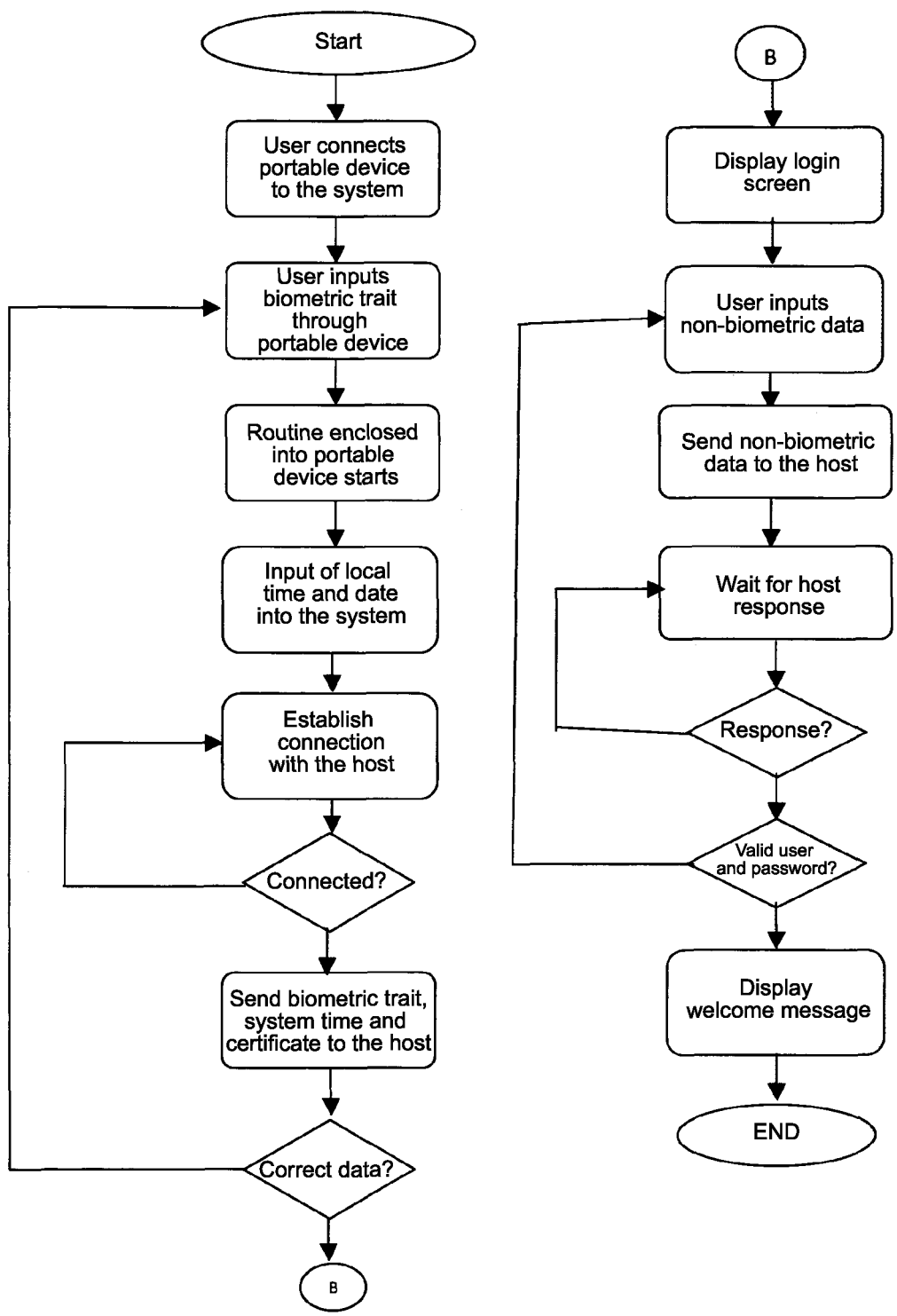
FIG. 2 shows a method of remote initialization to establish communication between client and host.
Figure 3:
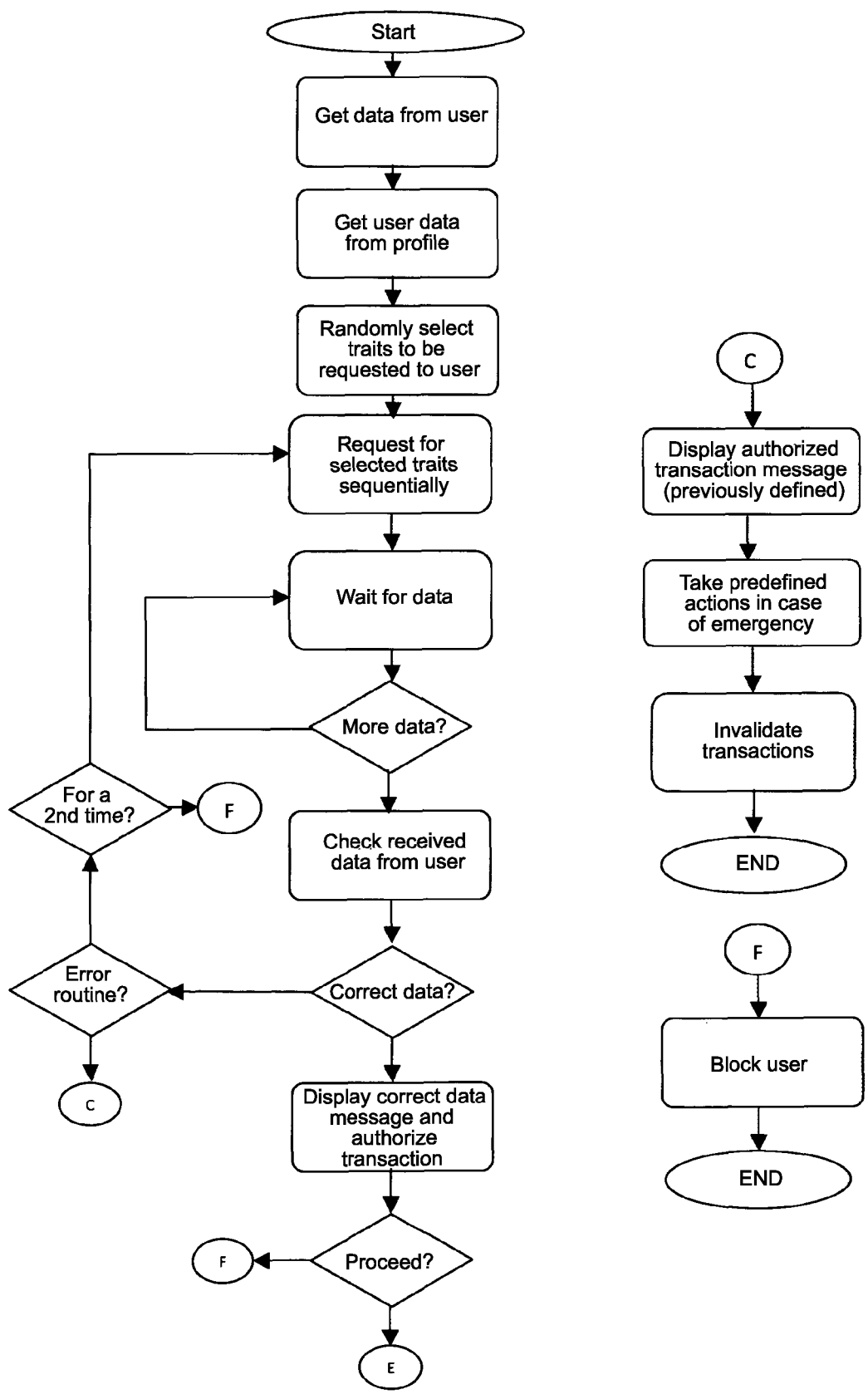
FIGS. 3 and 4 shows the method of user identification, signature, validation and expression of will.
Figure 4:
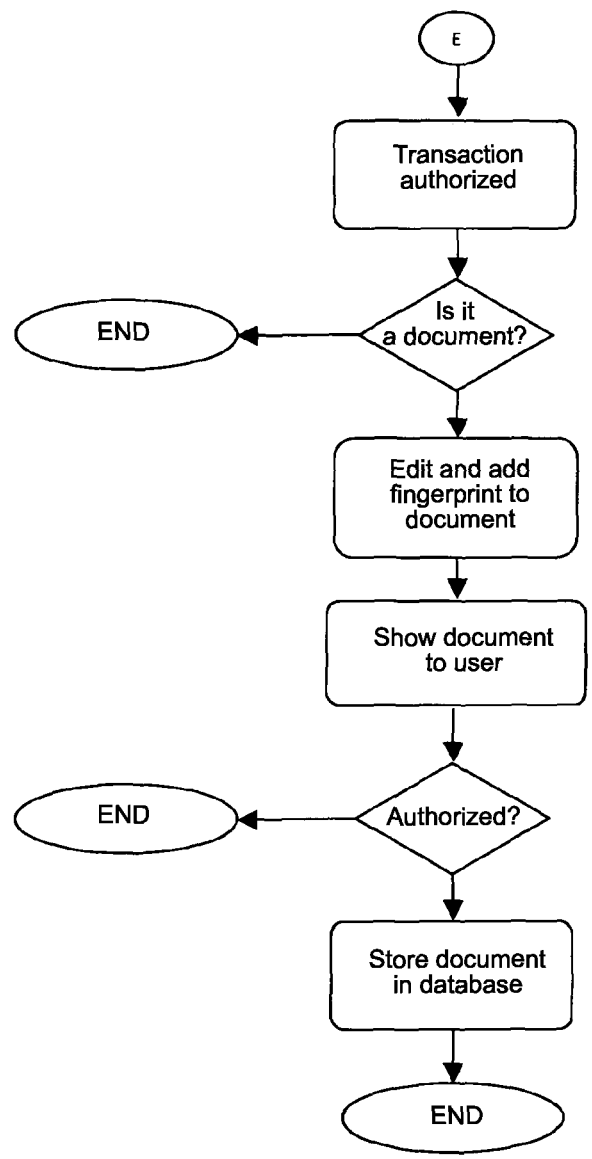
Figure 5:
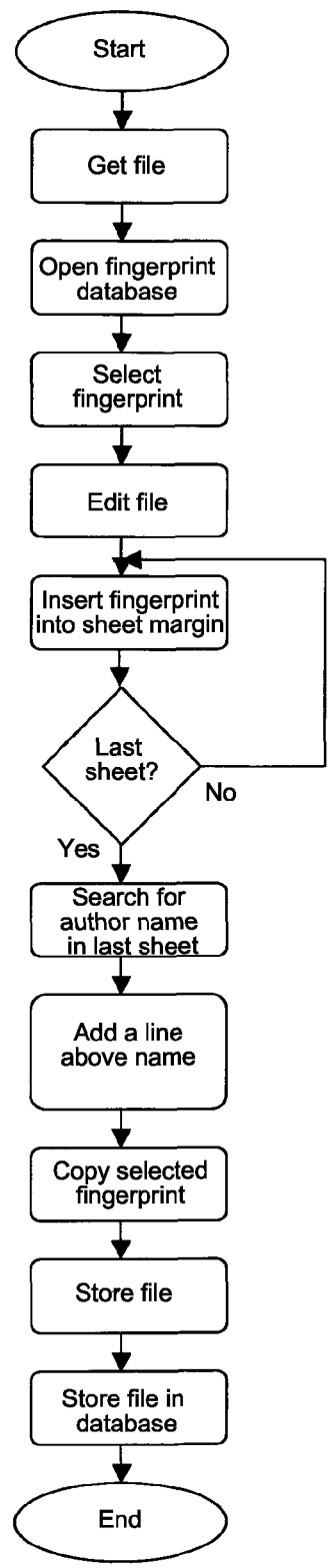
FIG. 5 shows methods of expression of will in a document to make it fully valid and legally pertinent.
Figure 6:
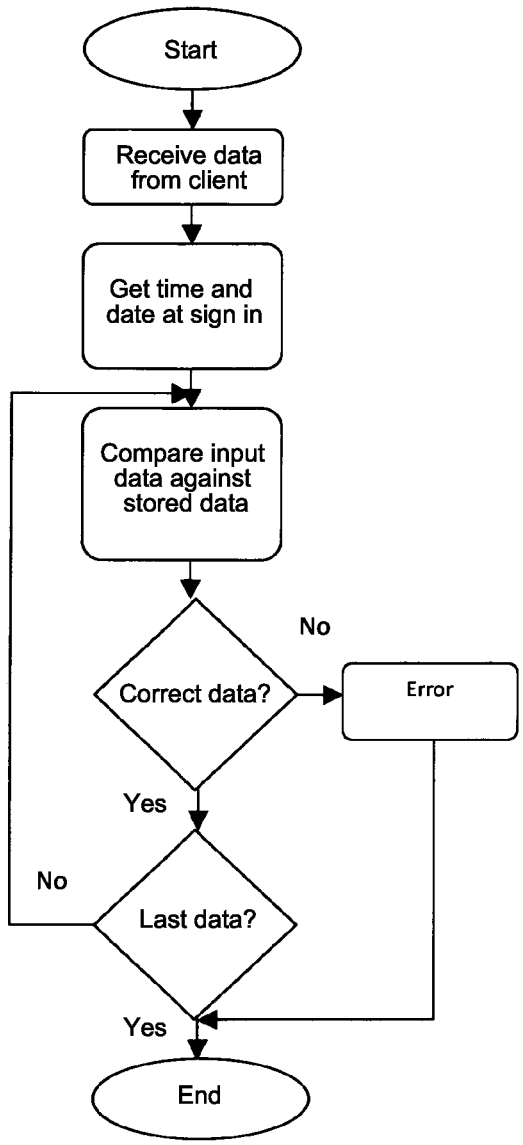
FIG. 6 shows the method of revision of data in function of time.
Figure 7:
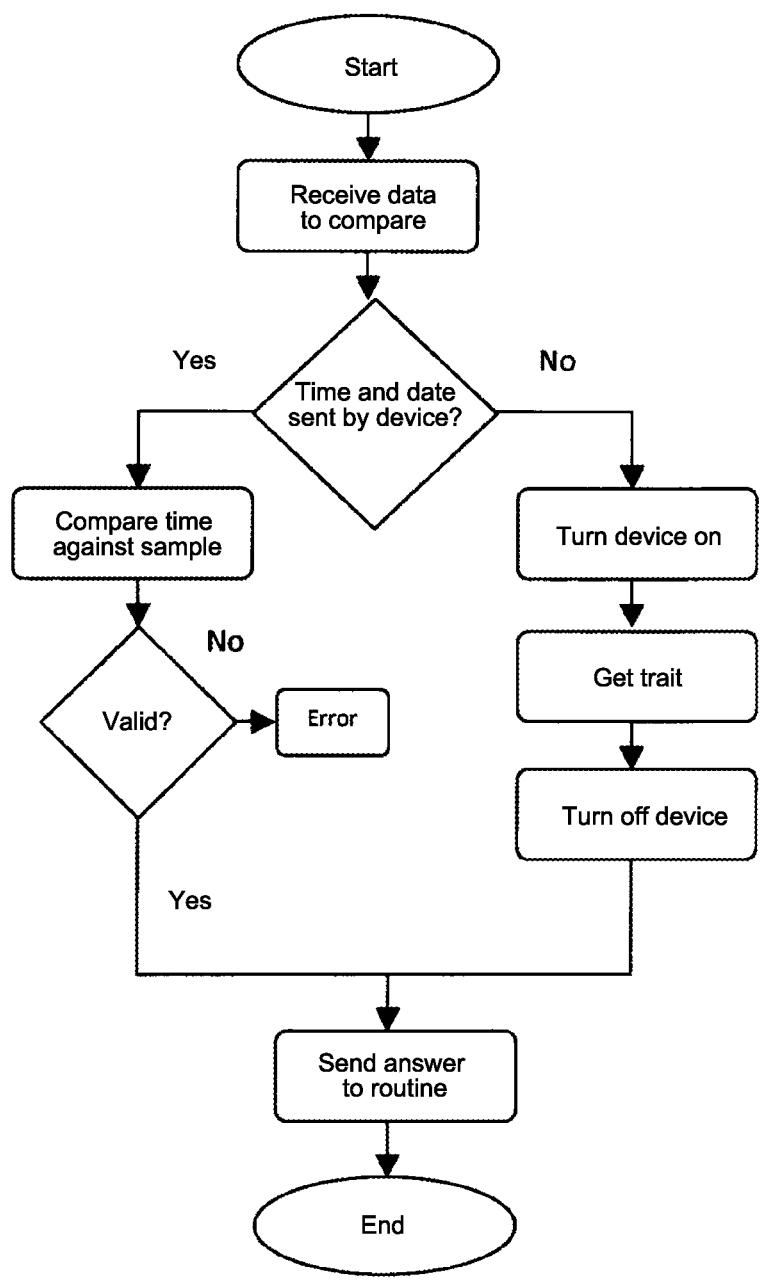
FIG. 7 shows the method of revision of the sample time.
Figure 8:
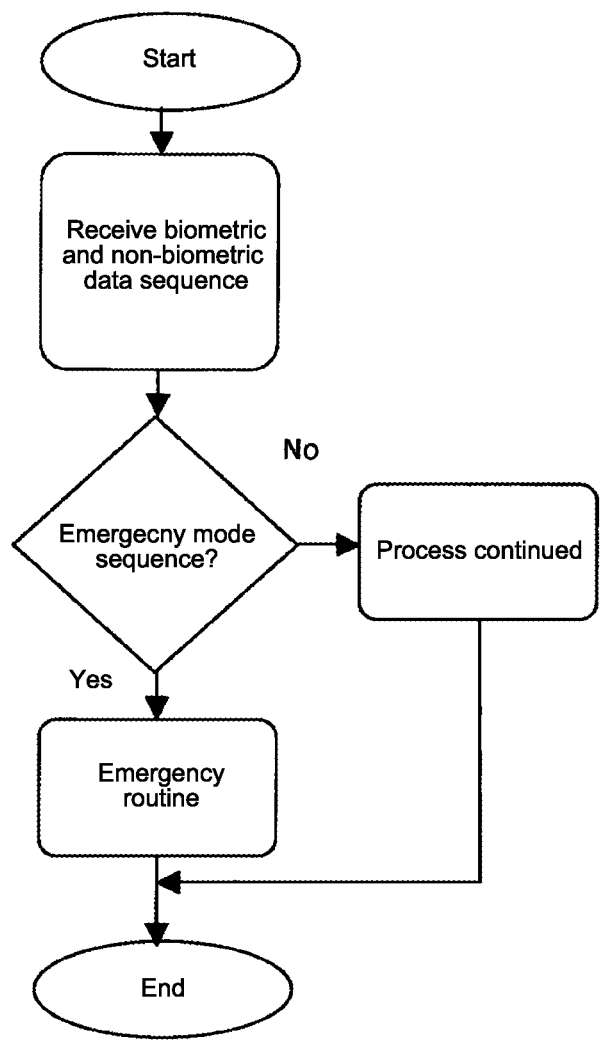
FIG. 8 shows the emergency mode method in case the user is forced to express his will.
Figure 9:
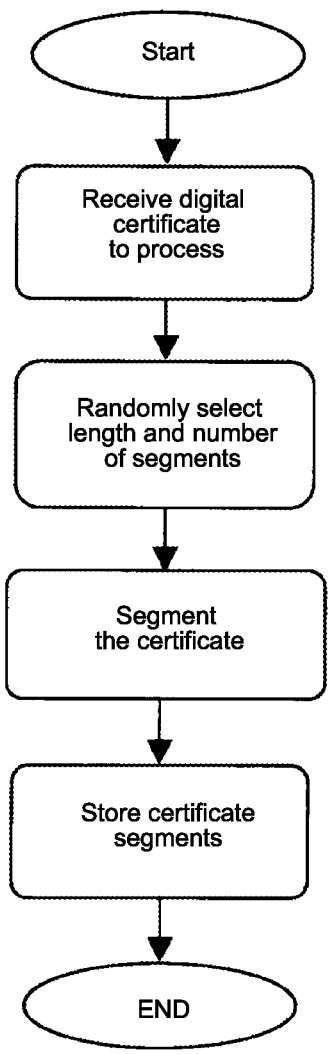
FIG. 9 shows the method to process (segment) the generated digital certificate.

The invention consists in making an individual, whatever it is, manages to be fully identified by the system and thereby express their will remotely using electro biometric traits, everything starts with the administration of user profiles, where the end customer or user will enter through the help of an administrator, properly trained, his personal data, his official data (identification cards, professional license number, passport, etc.) and finally his biometric traits. Except for personal and official data to be entered in the appropriate fields, biometric traits will be entered in a sequence defined by the user, so that only this person knows exactly the number corresponding to each one of his biometric traits, along with this process, the system checks that duplicate traits are not admitted or repeatedly, meaning, e.g. that only one fingerprint is entered 10 times in the 10 fields corresponding to the 10 fingers of both hands, finally the user must enter a sequence of data, whether biometric and non biometric traits, to the system enters an emergency mode and take the actions previously defined by the user in case this sequence is entered at any time. Actions can range, for example, from displaying a message of "insufficient funds" if the user is in front of an ATM and is being forced to withdraw some of his funds in a non-voluntary way, it can also send a message to a police corporation warning of the action being happening right then and there, as well as to reduce dramatically the fund balance to deter unauthorized third parties.

If the user wants to enter less than the required biometric traits that the system is asking for, authorization must be obtained from an administrator with more privileges than the person who is helping the end user. This could occur if a person lacks one or more fingers of one hand, one eye, just to mention a few of the reasons why a user would not enter all biometric traits into the system.

At this point, a digital certificate can be generated so that the end user can access the system remotely, once the certificate is generated by methods known in the industry and before it is delivered to the customer for use, it is segmented, so that the user does not take the full certificate but one or some parts of it and the remaining parts are stored in the database fields assigned for this purpose, the system also stores the sequence in which the certificate was segmented and which segment or segments were delivered to the user so that when it is signed remotely the system is able to revert the process and thus to recognize whether the segments correspond to the certificate stored in the database.

Once this process is done, one or several segments of the segmented certificate are delivered to the end user in a device such as a USB with fingerprint scanning capability, up to this step, each and every one of the user data are contained in the database addressed to this purpose.

When the user decides to connect to the system remotely, he must connect the device on which the segmented certificate was delivered or by opening the file containing the segmented certificate and at the same time enter the requested biometric trait on the device appropriate for such a trait (e.g. fingerprint), within this device (hard disk file or external via USB) there is a process that will be initialized in the moment that said two previous acts happen and in the first moment it will get the system's local time (time and date) when the user entered the device with segmented certificate or executed it, once this is done, the process establishes a connection to the host where the server code of this application is contained, once the connection is established, the process sends the collected data (user's fingerprint, a segment of the certificate and the system's local time), it is then that the server processes this information and if it is correct, it will send to the client a request to enter username and password, the user types this information on his "sign on" screen and presses the submit button, the information is then sent back to the server who validates that all data is correct and then the process of user login to the system is completed, in case that one of the data is inaccurate, then the system will request all data again, if biometrics are entered in a random way, once the complete data is entered, it is checked and if they are not correct again it will lock the user into the system, the number of attempts to enter the system is configurable so that it may be two, three, five, ten, or the number previously defined in the configuration of the system.

Once he is identified and access has been validated, the user can perform all desired activities and allowed by the system, however at the time the user wants to express his will is necessary that the user signs. This is why the system will request a random number of biometric traits and to achieve this, the subject information is obtained from the user profiles and checked against the existing number of biometric traits in his profile. Then a random number of them is selected and the user is requested to enter them, e.g. displaying a message on his screen requesting input of fingerprint number 3, the user must enter this fingerprint, and the client on his system will send it to the host. Then, he is requested for the read of the iris of the right eye and the user must proceed to enter this data into the system and so on until the total number of traits and/or data requested randomly by the system.

The system must check each and every one of the data and collate them against the contents of the database, in case one of the data does not match exactly with the one stored it will be requested again, and so it continues until the data is correct or the maximum number of attempts allowed for this action is reached. Once the user traits are recognized, the act or document to be issued is then taken as the true expression of his will and he is notified that the transaction will be authorized and finally the customer will express his will with a confirmation that may be entered in various ways, e.g. by using a password.

If this action involves expressing the will through a document, then this document will be edited by the system and will add the fingerprint previously selected by the user to the margin of each page and on the last page on the line above his name so that when the document is saved it has the fingerprints of the user, making the document fully valid and legally pertinent. Conversely if the user entered in this process a data stream or a password that match those established for their safety in case of emergency, all the previous steps will be invalidated, but the message to the user remains the same, and the system takes predefined actions for these cases, e.g., sending an alert to police corporations, invalidating the actions signed with said security sequence, etc.

The time of input of the last biometric trait is checked at all times, so that when a preset period has passed, the system requests the input of a biometric trait again.

The database checks that the certificate segment sent by the user matches the rest of the certificate.

This series of methods that together achieve the goal of full identification and expression of will by remote electro biometric signing of the person using the system to perform acts of his convenience.

These methods can be used independently and still work, citing the following as an example without being understood that the method is limited by it and that the typing of numbers previously defined may be substituted for an action previously defined by the entity and its customer: the security system when expressing a coerced willingness It is useful in transactions involving ATM withdrawals, because if the user is being forced to perform this activity, he can type the number sequence, previously defined by him, and thus execute a sequence of events in the banking system which can range from: displaying on the screen an amount of money much lower than the balance available, displaying an error message stating there are no at the ATM and/or send a message to the police corporations warning them of the activity being carried out there, being able to activate the security cameras for video capture handling and photograph shooting.

Method of capturing user profile and their biometric data, using fingerprints as an expository example, but not limited to it, in the understanding that the method works with each and every one of the biometric traits of the person, where a combination of iris recognition, voice recognition, etc. is possible.

The administrator captures all required data of the user (name, official IDs, etc.).

The administrator has a system that captures the maximum number of user fingerprints (10) and if he has less than 10 a supervisor signature is requested in order to capture a smaller number of fingerprints.

The fingerprints are captured in different ways:
Randomly
In the order chosen by the user.
In sequential order starting with the little finger of the left hand (last from right to left) of the left hand and ending with the little finger (last from left to right) of the right hand or backwards.
In sequential order by choosing a random finger to start and continue in the direction chosen by the user.

The system checks that no fingerprint is repeated, meaning that the customer used the same finger to capture all the fingerprints.

The system requires user interaction to ensure that the person capturing the fingerprints is who he says he is and the documents proving their identity are captured for that purpose.

When finishing the input of all the biometric data and user profile data, the system creates a digital certificate and segments it in a random number of segments, in such a way that the user is handed over only one part of the segments, leaving the rest of them in the database in order to revert the process when necessary, to be stored on the portable device or contained in a file, both already described, which together with the user's fingerprint will work as the key to access the host.

Method of Communication and Validation of Credentials with the Client

The host is able to maintain an open communication to receive client requests and establish secure communication (SSL) with the same.

When the user connects the portable device or access the system via a file or a website (internet or intranet), the host will immediately request id to the system through a biometric recognition device, either through the same portable device if capable, or from another, and by entering his fingerprint, it will run a process contained within it, which will request access to the system, while sending the system's time and date in which the portable device was connected, the segment or segments of the digital certificate will be sent with this information.

The host must request, through customer interaction client installed in the portable or fixed recognition device connected to the client system, the user assigned to it and the password to complete his entry into the system.

The host makes the comparison of the times in which the data were entered into the system, particularly the fingerprint, to ensure that the read fingerprint is recent, if said fingerprint exceeds a certain period from being read then the user will be requested to enter the fingerprint again. In case the entered fingerprint does not meet the criteria established to ensure the freshness of said fingerprint then the user will be blocked from the system and will need to come in person with the administrator to unlock his user profile.

Through an analysis of times, the host checks the times in which actions have been taken to prevent that the date and time of the system have been modified.

The host performs an analysis of the segments sent by the client to verify that they are originally generated by the system itself Furthermore, the host validates that all data entered by the user are correct in order to allow his entry into the system.

Client System

The client sends the machine's local time at the moment of the biometric data request, previously selected at random.

Will and Document Validation System and Applicable

Once the user is fully identified, this is the way of validation for each document entered to the system.

When a user wants to enter or approve a document, cast a vote or signed opinion, sign a document of any kind submitted for signature, express authoring, make or authorize any transaction or giving and receiving power of attorney in the system, among other similar actions associated with the use of the signature:

The host will ask a random number of biometric traits in sequence, that is to say, it will request a first and a second biometric trait and so on in succession, assuring with this, the user is present at the time of validation of his biometric data to express his action or oppose his exception.

With the document and the user's biometric traits readily available, then one of said biometric traits (e.g. fingerprint) will be added to the document and converted to a format that can not be altered but only introduced into the system.

By using the password the user approves the document once in the system

Since the document holds the user's biometric trait and said document has been approved through his password, said document will be modified within its attributes to be read only (not modified) and so it will be published in the system immediately or with a delay specified among the parties if considered appropriate form security reasons.

Increased security system in cases where the user is forced to express his will and/or in case that any given entity, personal, public and/or private is in need to protect its information, documents or assets, this method starts with the input of the person's biometric data so that it is stored in data management systems of the entities for further check.

Example 1

The system will store a sequence of information, biometric traits or user data for its use only in emergencies where the user is forced to express his will for any reason. The actions are reversible, since they were never systematically validated. By default, this sequence will not be requested to the user by the system.

Example 2

Method included within an access system for a bank building through registration of a fingerprint, which will take a picture of the user at the moment of entry, granting later access to said user.

What is claimed is:

1. Method to perform a supplemented electronic biometric signature for legal identification and interaction of persons comprising an input of a users' data to set a profile of each one of said users, wherein said profile includes a user's biometric traits, generation of a digital certificate, connection to a system having a database and expression of will, comprising the steps of:
   a) input of user's biometric traits in a predetermined sequence,
   b) check that none of the traits is entered repeatedly,
   c) set an input sequence to enter an emergency mode consisting of data and/or biometric traits,
   d) generate a digital certificate,
   e) segment the digital certificate,
   f) store in the database a sequence, in which the certificate was segmented,
   g) deliver one or more segments of the digital certificate to the user in a storage device,
   h) identify which segments were delivered to the user and which segments are stored in the system,
   i) connect the storage device and simultaneously enter at least one biometric trait through a device suitable for this purpose,
   j) input of local time to access the system,
   k) grant access to the system,
   l) send segments of the digital certificate held by the user, biometric trait(s) entered and local time of access to the system,
   m) verification of the segments of the digital certificate and biometric trait(s),
   n) input of user ID and password into the system,
   o) user ID and password validation,
   p) request for expression of will or signature by means of random selection and solicitation, both in amount and type, of biometric traits stored in the database,
   q) send the biometric trait(s) entered,
   r) verification of the requested biometric trait(s),
   s) authorization of the operation,
   t) Request the user for confirmation, and
   u) if previous step involves a new expression of will through document opening, then said document is edited to include at the margin of it a previously selected biometric trait(s).

2. Method to perform a supplemented electronic biometric signature for legal identification and interaction of persons comprising the input of users' data to set a profile of each one of said users, wherein said profile includes user's biometric traits, generation of a digital certificate, connection to a database and expression of will, according to claim 1, wherein step a) input of user's biometric traits in a predetermined sequence, may require a variable number of biometric traits.

3. Method to perform a supplemented electronic biometric signature for legal identification and interaction of persons comprising the input of users' data to set a profile of each one of said users, wherein said profile includes user's biometric traits, generation of a digital certificate, connection to a database and expression of will, according to claim 1, wherein step c) set an input sequence to enter emergency mode, is done by entering a sequence of data and/or biometric traits.

4. Method to perform a supplemented electronic biometric signature for legal identification and interaction of persons comprising the input of users' data to set a profile of each one of said users, wherein said profile includes user's biometric traits, generation of a digital certificate, connection to a database and expression of will, according to claim 1, wherein the device of step g deliver one or more segments of the digital certificate to the user in a storage device, is preferably a device capable of reading a biometric trait.

5. Method to perform a supplemented electronic biometric signature for legal identification and interaction of persons comprising the input of users' data to set a profile of each one of said users, wherein said profile includes user's biometric traits, generation of a digital certificate, connection to a database and expression of will, according to claim 1, wherein when data entries do not match the data stored in the system within steps
   m) verification of the segments of the digital certificate and biometric trait(s),
   o) user ID and password validation and
   r) verification of the requested biometric trait(s), said system requests for the data again in a predetermined number of times.

6. Method to perform a supplemented electronic biometric signature for legal identification and interaction of persons comprising the input of users' data to set a profile of each one of said users, wherein said profile includes user's biometric traits, generation of a digital certificate, connection to a database and expression of will, according to claim 1, wherein the system may block itself once a data request predetermined number of times is reached.

7. Method to perform a supplemented electronic biometric signature for legal identification and interaction of persons comprising the input of users' data to set a profile of each one of said users, wherein said profile includes user's biometric traits, generation of a digital certificate, connection to a database and expression of will, according to claim 1, wherein a number of times of data request is specified during user data input in step a).

8. Method to perform a supplemented electronic biometric signature for legal identification and interaction of persons comprising the input of users' data to set a profile of each one of said users, wherein said profile includes user's biometric traits, generation of a digital certificate, connection to a database and expression of will, according to claim 1, wherein an emergency mode input sequence may be entered at any time when the system requests data.

9. Method to perform a supplemented electronic biometric signature for legal identification and interaction of persons comprising the input of users' data to set a profile of each one of said users, wherein said profile includes user's biometric traits, generation of a digital certificate, connection to a database and expression of will, according to claim 1, wherein all previous transactions are invalidated upon sequence to emergency mode entry.

10. Method to perform a supplemented electronic biometric signature for legal identification and interaction of persons comprising the input of users' data to set a profile of each one of said users, wherein said profile includes user's biometric traits, generation of a digital certificate, connection to a database and expression of will, according to claim 1, wherein the system may display a predetermined message upon sequence to emergency mode entry.

* * * * *